J. McKECHNIE AND B. N. WALLIS.
MOORING OF LIGHTER-THAN-AIR AIRCRAFT.
APPLICATION FILED MAR. 25, 1919.
1,309,533.
Patented July 8, 1919.
3 SHEETS—SHEET 1.
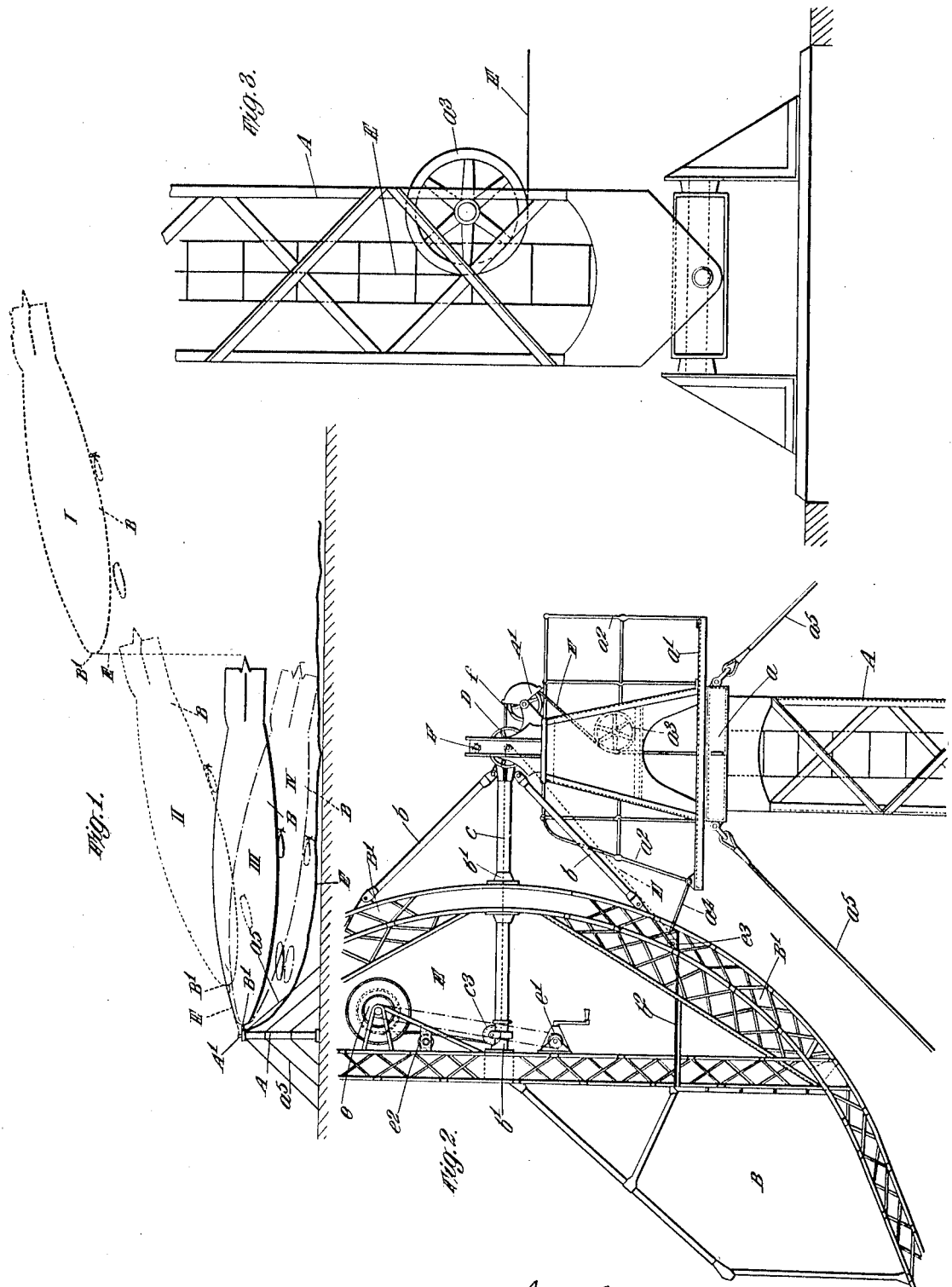

J. McKECHNIE AND B. N. WALLIS.
MOORING OF LIGHTER-THAN-AIR AIRCRAFT.
APPLICATION FILED MAR. 25, 1919.
1,309,533.
Patented July 8, 1919.
3 SHEETS—SHEET 2.
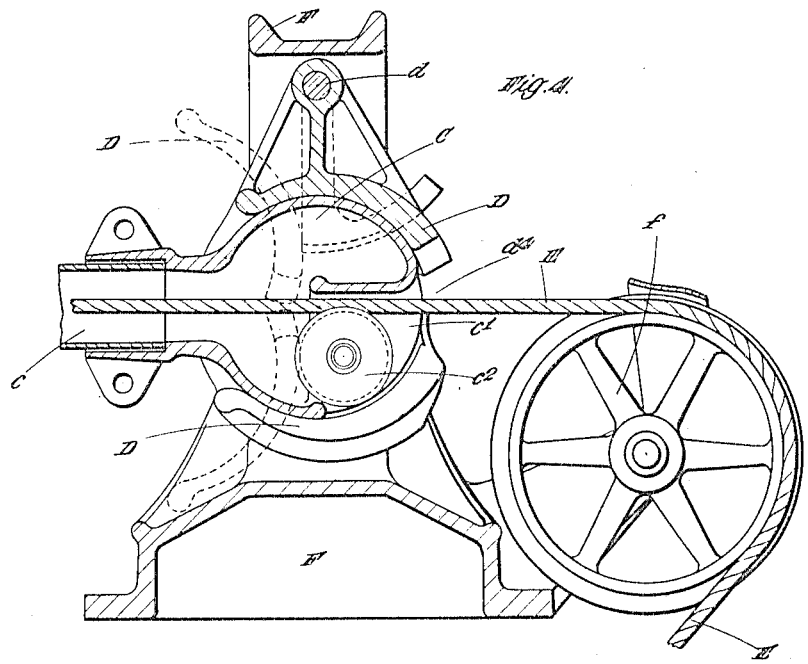
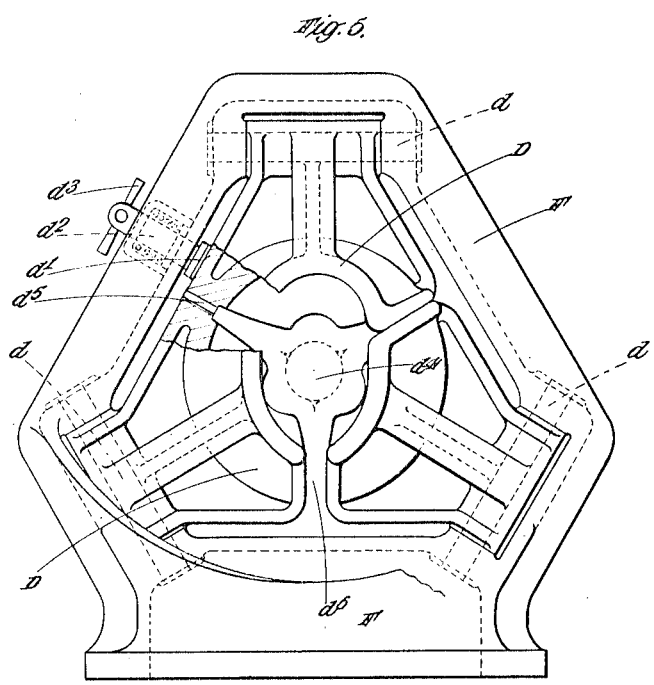

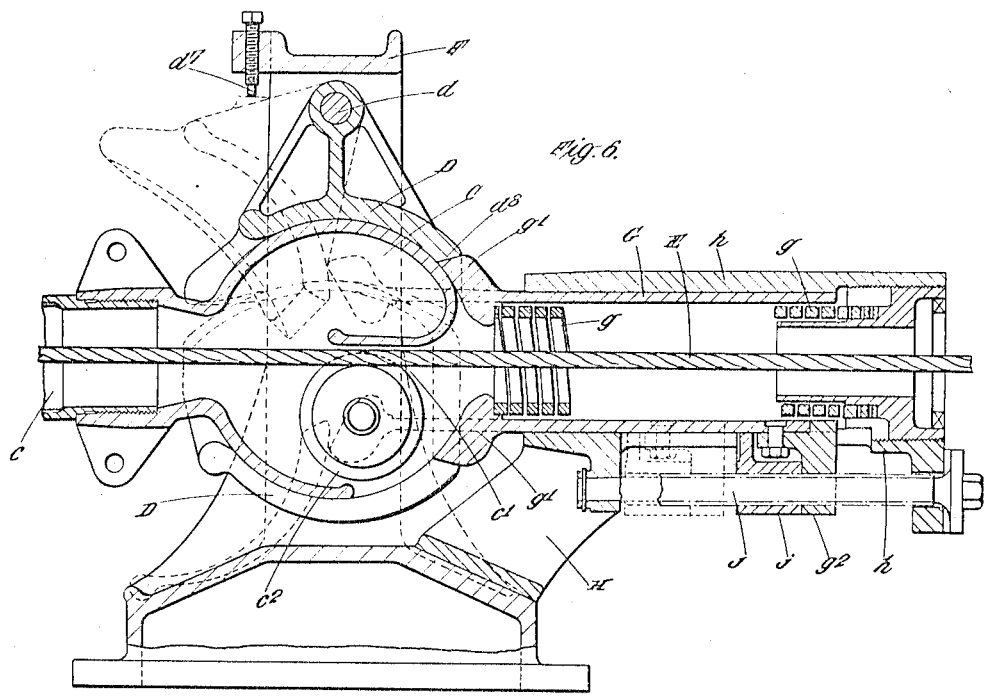

UNITED STATES PATENT OFFICE.

JAMES McKECHNIE, OF BARROW-IN-FURNESS, AND BARNES NEVILLE WALLIS, OF GRANGE-OVER-SANDS, ENGLAND, ASSIGNORS TO VICKERS LIMITED, OF WESTMINSTER, LONDON, ENGLAND.

MOORING OF LIGHTER-THAN-AIR AIRCRAFT.

1,309,533.      Specification of Letters Patent.      Patented July 8, 1919.

Application filed March 25, 1919. Serial No. 285,107.

*To all whom it may concern:*

Be it known that we, Sir JAMES McKECHNIE, K. B. E., and BARNES NEVILLE WALLIS, both subjects of the King of Great Britain, residing, respectively, at Naval Construction Works, Barrow-in-Furness, in the county of Lancaster, England, and 3 Kentsford Terrace, Kents Bank, Grange-over-Sands, in the county of Lancaster, England, have invented certain new and useful Improvements in or Relating to the Mooring of Lighter-Than-Air Aircraft, of which the following is a specification.

This invention relates to the mooring of lighter-than-air aircraft such as an airship to a mast in a manner which allows it to be secured in all weathers without undue risk of loss or damage to the airship and without the necessity of employing large bodies of men in continual attendance to handle the airship in stormy weather.

According to this invention the aircraft is moored to the mast by means of a ball and socket device the socket or clip member of which comprises a number of segments adapted to open and to close upon the ball member on the latter striking the socket, one of the said members being carried by the upper end of the mast while the other is secured to the nose or other convenient part of the aircraft. A mooring rope passes through or alongside of the ball and socket connection and is connected to suitable winding apparatus for hauling the aircraft into position. While the positive member of the connection is referred to as a ball, it is to be understood that although a spherical form is preferred the member is not necessarily spherical so long at it allows the socket or clipping member to engage around it.

In a convenient construction embodying the invention as adapted to a rigid airship a hollow spherical casting is mounted on the end of a tubular member passing into the nose of the airship and fixed to the airship structure by means of struts and couplings. The spherical casting is provided with a recess accommodating a pulley the upper edge of which pulley is in line with the axis of the tubular strut member to guide the mooring rope through the tube, on the inner end of which is a pulley mounted to swivel around the axis of the tube.

In the case of a non-rigid airship the ball or sphere may be carried by a strut member passing from the outside to the inside of the fabric envelop and secured to the latter by external wires or tubes corresponding to the struts of the rigid airship device, and by a secondary set of wires or tubes attaching the inner end of the strut member to points on the envelop meeting the external wires or tubes. This method of carrying a strut is already known.

The mast fitting comprises a main casting of suitable form for attaching to the masthead, the casting carrying two, three or more hollow spherical segments each turning upon a pin in such a manner that they can open the hollow sphere for reception of the ball or sphere carried by the airship and can then close upon the ball, forming a substantial part of a hollow encircling sphere.

In order that the said invention may be clearly understood and readily carried into effect, we will now describe the same more fully with reference to the accompanying drawings, in which:—

Figure 1 is a general view of a mast and airship attached at its nose to the upper end of the mast, showing the airship approaching and in a variety of positions.

Fig. 2 is an elevation of the masthead and the nose of the airship in engaged position.

Fig. 3 shows the lower end of the mast.

Figs. 4 and 5 are elevations at right angles to each other of the masthead socket and the airship attachment, and Fig. 6 shows a modification of the socket construction.

A is the mast. B is the airship to the nose B' of which is secured the ball C. D is the socket carried by the masthead A'. E is the mooring rope by which the airship is held.

In the rigid airship illustrated the ball C, which is in the form of a hollow spherical casting, is on the end of the tubular member $c$ which passes into the nose B' of the airship and is fixed to the structure by the struts $b$ and the couplings $b'$. In the underside of the spherical casting C is the recess $c'$ in which is mounted the pulley $c^2$, the upper edge of which is in line with the axis of the tube $c$. The mooring rope E passes over the small pulley $c^3$ mounted to swivel around the inner end of the tube $c$, through the tube $c$ and over the pulley $c^2$.

The mooring rope E is wound on a drum $e$ carried in the nose of the airship and provided with winding and brake gears $e'$, the rope E being fed on to the drum by means of a distributer pulley $e^2$ which is mounted on a right and left handed screw shaft with a spring buffer at each end so that the pulley travels to and fro as it is turned, to lead the rope evenly over the surface of the drum $e$. When the airship is in flight and the rope fully wound up, the end of the rope, after passing over the swiveling pulley $c^3$ and through the tube $c$ and sphere C extends back to a platform $b^2$ in the nose B' of the airship, where it may be attached at $e^3$ to sand bags holding the end in place, access being provided to the platform $b^2$ by a covered passage outside or inside the main hull of the airship.

In the case of a non-rigid airship the ball or sphere C may be carried by a strut member similar to the tube $c$ but passing from the outside to the inside of the fabric envelop and secured to the latter by external wires or tubes corresponding to the struts $b$ of the rigid airship device, and by a secondary set of wires or tubes attaching the inner end of the strut member to points on the envelop meeting the external wires or tubes. This method of carrying a strut is already known.

In the case of a non-rigid air-ship it may not be practicable to store the mooring rope in the nose of the ship, and it may therefore be led to a suitable position in the car, or the keel if fitted, passing through the strut and envelop or outside the envelop to the storage drum.

The mast-head A' is in the form of a pedestal mounted on roller bearings in a casing $a$, the pedestal carrying a platform $a'$ and handrails $a^2$. On top of the pedestal A' is bolted a casting F in which is supported the socket D. This is shown as composed of three hollow spherical segments each turning upon a pin $d$ carried at the angles of the casting F, in such a manner that they can open the hollow sphere for reception of the ball or sphere C carried by the airship and can then close upon the ball, forming a substantial part of a hollow encircling sphere.

Each segment may be provided with a tootherd rack $d'$ engaged by a spring plunger $d^2$ mounted on the casting and provided with hand gear $d^3$ enabling it to be drawn out of engagement with the toothed rack $d'$ when required. The segments D turn upon their pivot pins $d$, which are transverse to the axis of the spherical socket D, between definite limits constituting the open and closed positions as indicated in Fig. 4, and the rack $d'$ and plungers $d^2$ are so arranged that when in engagement the segments D can move only from the open to the closed position. The reverse movement is made possible only when the plungers $d^2$ are brought out of engagement with the segments D by the hand gear $d^3$. The segments are formed at their rear edges (see Fig. 4) in such a manner that when opened the rear portions meet to form a circular hole $d^4$ which serves as a guide for the mooring rope E when the airship is being hauled into position. The open position of the socket is shown in dotted lines in Fig. 4.

In mooring an airship the mooring rope E, which has been let down from the nose of the ship and seized, is passed through the guiding hole $d^4$ and led over the pulley $f$ on the side of the casting F, thence over pulleys $a^3$ on the mast to ground winding gear of any convenient type, which may be placed at the foot of the mast. When the nose of the guided ship reaches the mast the ball C strikes the opened segments D of the socket at their inner edges and presses them back, the segments turning around their pins $d$ until, as shown in Fig. 4, they close over the ball C and encircle it. As already mentioned, the segments cannot open out as long as the plungers $d^2$ are in engagement with them, and only when the plungers are withdrawn can the socket open to release the ball. The guiding hole $d^4$ is so placed behind the axis of the mast-head as to insure the coupling device turning to face the ship should the latter approach to one side, the mast-head A' rotating about the axis of the mast for this purpose.

Each segment may be arranged to gear with an adjacent segment by the teeth $d^5$ as shown in Fig. 5, so that all of the said segments can be opened by a lever attached to one only, or they may be opened by hand individually. The lower segments are preferably so formed as to leave a gap $d^6$ (Fig.
5) at the bottom of the sphere, to allow the mooring rope E, after the airship has been secured, to be uncoupled from the ground winch and wound on the drum $e$ in the airship, which is then held only by the ball and socket coupling and is ready for flight on opening the coupling.

In the construction shown in Fig. 6, which is the preferred construction, all the spherical segments of the socket or jaws D are under the control of a single spring loaded plunger G attached to the rear of the main casting F by a bracket H and guide $h$, this plunger holding the segments open, to a position limited by an adjusting screw $d^7$, under a pressure of say 500 to 1000 lbs. When the airship is hauled into position the ball moves the segments back against the pressure of the plunger spring $g$ until a hole $d^8$ formed by the rear edges of the closed segments, as already described for the rope guide, admits the end of the plunger G, the pressure on which is now considerably increased owing to the compression of the spring $g$ by the backward movement of the plunger. The said hole and the nose $g'$ of the plunger are tapered so that the tendency of the plunger on entering is to close the segments still further and hold the coupling ball C of the airship A closely in the socket, to prevent any play or backlash. The airship cannot be released until the plunger G is withdrawn, which may be effected by means of the screw J working in a nut $j$ acting on a lug $g^2$ on the plunger G, the latter after withdrawal and opening of the socket being allowed to move to the open position of the coupling by reversing the screw movement to a predetermined point. This gear eliminates the levers, racks and plungers of the first construction.

What we claim and desire to secure by Letters Patent of the United States is:—

1. An airship mooring comprising the combination of a mast with an expanding socket and ball coupling, said socket mounted on said mast, said ball mounted on the airship, means for holding said socket normally expanded, means for holding said socket closed about the ball when said ball enters the socket and means for disengaging said holding means to permit said socket to expand and release the airship.

2. An airship mooring comprising the combination of a mast with a multi-segment expanding socket and ball coupling, said socket rotatably mounted on said mast, said ball mounted on the structure of the airship, means for holding said socket segments normally expanded, means for holding said socket segments closed about the ball when said ball enters the socket and means for releasing said segments to release said ball.

3. An airship mooring comprising the combination of a mast with an expanding socket and ball coupling, said socket rotatably mounted on said mast, said ball mounted on the airship, means for holding said socket normally expanded, and means for guiding said ball to said socket, said socket adapted to close about the ball when it enters the socket, whereby all strain is relieved from said guiding means.

4. An airship mooring comprising the combination of a mast with an expanding socket and ball coupling, said socket mounted on said mast, said ball mounted on a projecting member of the airship structure, a cable fastened to the airship and passing through said ball, means for holding said socket normally expanded, said cable adapted to be passed through said socket whereby said ball is guided to said socket, said socket adapted to receive and close about said ball when the ball enters the socket, whereby all strain is relieved from said cable.

JAMES McKECHNIE.
BARNES NEVILLE WALLIS.